(12) United States Patent
Miura

(10) Patent No.: US 11,791,513 B2
(45) Date of Patent: Oct. 17, 2023

(54) ELECTROCHEMICAL CELL

(71) Applicant: Seiko Instruments Inc., Chiba (JP)

(72) Inventor: Ken Miura, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 99 days.

(21) Appl. No.: 17/469,081

(22) Filed: Sep. 8, 2021

(65) Prior Publication Data

US 2022/0109206 A1   Apr. 7, 2022

(30) Foreign Application Priority Data

Oct. 5, 2020   (JP) ................................ 2020-168691

(51) Int. Cl.
*H01M 50/183* (2021.01)
*H01M 50/184* (2021.01)
*H01M 50/171* (2021.01)

(52) U.S. Cl.
CPC ....... *H01M 50/184* (2021.01); *H01M 50/171* (2021.01)

(58) Field of Classification Search
None
See application file for complete search history.

(56) References Cited

U.S. PATENT DOCUMENTS

| 4,240,197 A | 12/1980 | Hamsag |
| 2013/0330601 A1 | 12/2013 | Mizuta et al. |
| 2014/0170472 A1 | 6/2014 | Hattori |

FOREIGN PATENT DOCUMENTS

| JP | S57-185667 A | 11/1982 |
| JP | 2003-051293 A | 2/2003 |
| JP | 2019-160619 A | 9/2019 |
| WO | WO 2013-046644 A1 | 4/2013 |
| WO | WO 2015/073858 A1 | 5/2015 |

OTHER PUBLICATIONS

Extended European Search Report in Europe Application No. 21196013.3, dated Feb. 22, 2022, 8 pages.

*Primary Examiner* — Alexander S Thomas
(74) *Attorney, Agent, or Firm* — Crowell & Moring LLP

(57) ABSTRACT

A battery includes a negative electrode can that is formed into a topped cylindrical shape. A negative electrode can circumferential wall portion includes a double cylinder portion that extends from an opening edge of the negative electrode can toward a top portion, and a step portion that connects the top portion to the double cylinder portion. The step portion includes a first curved portion that extends to a lower side from an outer circumferential edge of the top portion, a second curved portion that extends to an outer side of a radial direction from the first curved portion, and a third curved portion that extends to the lower side from the second curved portion. The double cylinder portion includes an inner cylinder portion that extends to the lower side from the third curved portion, and an outer cylinder portion that surrounds the inner cylinder portion from the outer side of the radial direction. A gasket is arranged on an outer side of the outer cylinder portion in the radial direction and on an upper side. An upper end edge of the outer cylinder portion is positioned further on the upper side than a center between both ends of the negative electrode can in an axial direction and is positioned further on the lower side than an upper end edge of the third curved portion.

4 Claims, 4 Drawing Sheets

ELECTROCHEMICAL CELL

RELATED APPLICATIONS

This application claims priority to Japanese Patent Application No. 2020-168691, filed on Oct. 5, 2020, the entire content of which is incorporated herein by reference.

BACKGROUND OF THE INVENTION

1. Field of the Invention

The present invention relates to an electrochemical cell.

2. Description of the Related Art

A container of an electrochemical cell that is sealed by clamping an opening portion of an outer metal can of a pair of metal cans in a state where a gasket is interposed between the opening portions of the pair of metal cans is present. For this type of electrochemical cell, a technology for improving sealability in order to increase reliability has been developed. For example, a coin-shaped battery disclosed in PCT International Publication No. WO 2013/046644 includes a first curved portion in which a negative electrode can (sealing plate) is formed at a boundary between a ceiling portion and a second side wall, a second curved portion that is formed next to the first curved portion, a third curved portion that is formed next to the second curved portion, and a falling portion that is formed next to the third curved portion. The radius of curvature of the first curved portion and the radius of curvature of the second curved portion are defined. Accordingly, in a case of clamping an opening end portion of a positive electrode can (battery case), deformation of the negative electrode can at a time of clamping can be significantly suppressed by distributing a pressure applied to the second side wall of the negative electrode can in a wider range.

In recent years, a small non-aqueous electrolyte secondary battery that is one type of electrochemical cell has been required to support reflow soldering in order to increase efficiency of soldering at a time of mounting a circuit substrate. For example, in a non-aqueous electrolyte secondary battery disclosed in Japanese Unexamined Patent Application, First Publication No. 2019-160619, heat resistance of resisting heat at a time of reflow soldering is obtained by using a solvent that is a glyme-based solvent containing ethylene carbonate (EC) and vinylene carbonate (VC).

SUMMARY OF THE INVENTION

However, in the reflow soldering, an internal pressure of the container of the electrochemical cell can easily rise due to heat at the time of mounting. Thus, further improvement in sealability is necessary.

In addition, in the reflow-solderable electrochemical cell, it is required to increase an electric capacity without increasing a mounting area. Therefore, in a case of increasing the electric capacity by increasing a thickness of the electrochemical cell, circumferential wall portions of a pair of metal cans are increased in the height direction. Thus, in a case where the pressure is distributed in a wide range at the time of clamping above, a pressure is applied to the circumferential wall portion of the negative electrode can in a wider range. Thus, deformation of the negative electrode can occurs, and there is a possibility of a decrease in sealability.

Therefore, the present invention provides a reflow-solderable electrochemical cell that has exceptional sealability and a high electric capacity.

An electrochemical cell according to a first aspect of the present invention includes a positive electrode can that is formed into a bottomed cylindrical shape and includes a bottom portion and a positive electrode can circumferential wall portion extending in a first direction of an axial direction from an outer circumferential edge of the bottom portion, a negative electrode can that is formed into a topped cylindrical shape, includes a top portion and a negative electrode can circumferential wall portion extending in a second direction of the axial direction from an outer circumferential edge of the top portion and is inserted into an inner side of the positive electrode can, and a gasket that is arranged between the positive electrode can circumferential wall portion and the negative electrode can circumferential wall portion and is pressed to an outer circumferential surface of the negative electrode can by narrowing an opening edge of the positive electrode can, in which the negative electrode can circumferential wall portion includes a double cylinder portion that extends in the first direction from an opening edge of the negative electrode can toward the top portion, and a step portion that connects the top portion to the double cylinder portion, the step portion includes a first curved portion that extends in a curved manner in the second direction from the outer circumferential edge of the top portion, a second curved portion that extends in a curved manner from an end edge of the first curved portion in the second direction to an outer side of a radial direction, and a third curved portion that extends in a curved manner in the second direction from an outer circumferential edge of the second curved portion, the double cylinder portion includes an inner cylinder portion that extends in the second direction from an end edge of the third curved portion in the second direction, an outer cylinder portion that surrounds the inner cylinder portion from the outer side of the radial direction, and a folded portion that is disposed at the opening edge of the negative electrode can and connects the inner cylinder portion to the outer cylinder portion, the gasket is arranged on at least an outer side of the outer cylinder portion in the radial direction and in the first direction, and an end edge of the outer cylinder portion in the first direction is positioned further in the first direction than a center between both ends of the negative electrode can in the axial direction and is positioned further in the second direction than an end edge of the third curved portion in the first direction.

According to the electrochemical cell according to the first aspect, the outer cylinder portion that is large in the axial direction can be disposed. Thus, the negative electrode can circumferential wall portion can be provided with high durability against a pressure applied from the outer side of the radial direction. Accordingly, a strong pressure can be applied to the gasket by narrowing the opening edge of the positive electrode can, and the negative electrode can can be sufficiently pressed in the first direction and from the outer side of the radial direction. Accordingly, since the outer cylinder portion does not protrude further in the first direction than the third curved portion, penetration of the outer cylinder portion into the gasket arranged in the first direction of the outer cylinder portion can be suppressed. Thus, even in a case where a strong pressure is applied to the gasket, damage to the gasket by contact with the outer cylinder portion can be suppressed. Thus, since moisture that enters inside from the opening portion of the positive electrode can through a surface of the gasket can be suppressed, even an electrochemical cell of which a thickness is increased in order to increase an electric capacity can be provided with exceptional sealability. Accordingly, a reflow-solderable electrochemical cell that has exceptional sealability and a high electric capacity can be provided.

An electrochemical cell according to a second aspect of the present invention is the electrochemical cell according to the first aspect, in which the end edge of the outer cylinder portion in the first direction may be positioned further in the first direction than an end edge of the inner cylinder portion in the first direction.

According to the electrochemical cell according to the second aspect, the entire inner cylinder portion can be surrounded by the outer cylinder portion. Accordingly, since a part having a double structure can be disposed to the maximum extent in the double cylinder portion, the double cylinder portion can be provided with higher durability.

An electrochemical cell according to a third aspect of the present invention is the electrochemical cell according to the first or second aspect, in which the gasket may include a ring-shaped base portion that is arranged between the bottom portion of the positive electrode can and the opening edge of the negative electrode can, an outer wall portion that protrudes in the first direction from an outer circumferential portion of the base portion and extends across an entire circumference in a circumferential direction, and is arranged between the positive electrode can circumferential wall portion and the negative electrode can circumferential wall portion, and an inner wall portion that protrudes in the first direction from the base portion on an inner side of the negative electrode can circumferential wall portion and extends across the entire circumference in the circumferential direction, and a thickness of the base portion in the axial direction may be greater than a maximum thickness of each of the outer wall portion and the inner wall portion in the radial direction.

According to the electrochemical cell according to the third aspect, the thickness of particularly part of the outer wall portion that is close to the base portion can be secured. Accordingly, in the electrochemical cell of which the thickness is increased in order to increase the electric capacity, strength of the gasket can be secured. In addition, since a sufficient amount of the gasket is arranged between the bottom portion of the positive electrode can and the opening edge of the negative electrode can, the positive electrode can and the negative electrode can can be sufficiently brought into close contact with the gasket in a case of clamping of the positive electrode can. Accordingly, the electrochemical cell having exceptional sealability can be formed. Furthermore, a length of the negative electrode can circumferential wall portion in the axial direction can be reduced by an amount corresponding to an increase in thickness of the base portion in the axial direction. Thus, a force exerted on the negative electrode can circumferential wall portion can be decreased by reducing an area of the negative electrode can circumferential wall portion in which a pressure is applied through the gasket. Thus, deformation of the negative electrode can can be suppressed.

An electrochemical cell according to a fourth aspect of the present invention is the electrochemical cell according to any one of the first to third aspects, in which an end portion of the outer circumferential surface of the outer cylinder portion in the first direction may be chamfered across the entire circumference.

According to the electrochemical cell according to the fourth aspect, application of an excessive pressure from the outer cylinder portion to the gasket arranged in the first direction of the outer cylinder portion can be suppressed. Thus, even in a case where a strong pressure is applied to the gasket, damage to the gasket by contact with the outer cylinder portion can be suppressed.

DETAILED DESCRIPTION OF THE PREFERRED EMBODIMENTS

Hereinafter, an embodiment of the present invention will be described based on the drawings. In the following description, configurations having the same or similar functions will be designated by the same reference signs. Duplicate descriptions of such configurations may be omitted. A non-aqueous electrolyte secondary battery (electrochemical cell) of the embodiment is a secondary battery in which an active material used as a positive electrode or a negative electrode and a separator are accommodated in an accommodation container. In the following description, the non-aqueous electrolyte secondary battery will be simply referred to as the battery.

Figure 1:
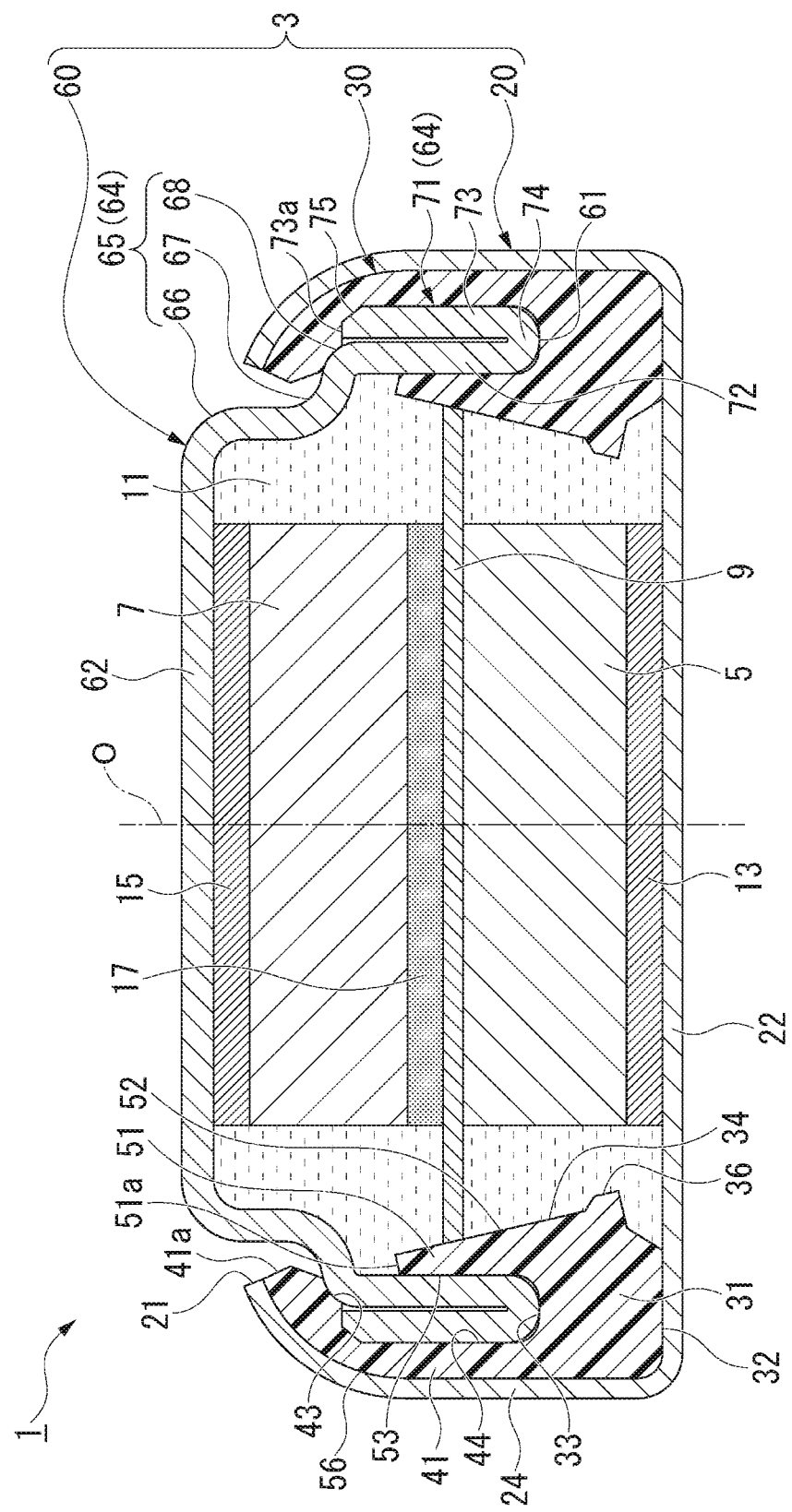
FIG. 1 is a cross-sectional view of a battery according to an embodiment.

FIG. 1 is a cross-sectional view of the battery according to the embodiment.

As shown in FIG. 1, a battery 1 of the embodiment is a coin-shaped (button-shaped) battery. The battery 1 of the present embodiment is a small coin-shaped battery of which an outer diameter is set to approximately 5 mm and a thickness is set to approximately 2 mm. However, the outer diameter of the battery 1 is not limited thereto. The battery 1 includes an exterior body 3 that has a circular shape in a plan view, a positive electrode 5, a negative electrode 7, and a separator 9 that are arranged in the exterior body 3, and an electrolytic solution 11 with which the exterior body 3 is filled. The exterior body 3 includes a positive electrode can 20 and a negative electrode can 60 that is attached to the positive electrode can 20 through an insulating gasket 30. Details of the exterior body 3 will be described later.

The positive electrode 5 and the negative electrode 7 are arranged in a state of facing each other through the separator 9. The positive electrode 5 is electrically connected to an inner surface of the positive electrode can 20 through a positive electrode current collector 13. The negative electrode 7 is electrically connected to an inner surface of the negative electrode can 60 through a negative electrode current collector 15. The positive electrode can 20 may have a function of a current collector by directly connecting the positive electrode 5 to the positive electrode can 20. In addition, the negative electrode can 60 may have the function of the current collector by directly connecting the negative electrode 7 to the negative electrode can 60. The positive electrode 5, the negative electrode 7, and the separator 9 are impregnated with the electrolytic solution 11 with which the exterior body 3 is filled.

In the positive electrode 5, while a type of positive electrode active material is not particularly limited, for example, a positive electrode active material that contains a lithium manganese oxide is preferably used. A contained amount of the positive electrode active material in the positive electrode 5 is decided by considering a discharge capacity or the like required for the battery 1 and can be set within a range of 50% by mass to 95% by mass. In a case where the contained amount of the positive electrode active material is a lower limit value or greater of the preferable range, a sufficient discharge capacity is easily obtained. In a case where the contained amount of the positive electrode active material is the preferable upper limit value or less, the positive electrode 5 is easily molded.

The positive electrode 5 may contain a conductive agent. Hereinafter, the conductive agent used in the positive electrode 5 will be referred to as a "positive electrode conductive agent". For example, carbon materials such as furnace black, Ketjen-black, acetylene black, and graphite are exemplary examples of the positive electrode conductive agent. As the positive electrode conductive agent, one type of the materials may be used alone, or two types or more may be used in combination.

The positive electrode 5 may contain a binder. Hereinafter, the binder used in the positive electrode 5 will be referred to as a "positive electrode binder". As the positive electrode binder, for example, polytetrafluoroethylene (PTFE), polyvinylidene fluoride (PVDF), styrene-butadiene rubber (SBR), polyacrylate (PA), carboxymethyl cellulose (CMC), and polyvinyl alcohol (PVA) can be selected. In addition, as the positive electrode binder, one type of the materials may be used alone, or two types or more may be used in combination. For example, a contained amount of the positive electrode binder in the positive electrode 5 can be set to 1% by mass to 20% by mass. A conductive resin adhesive in which carbon acts as a conductive filler can be used as the positive electrode current collector 13.

In addition, in the present embodiment, the positive electrode 5 may contain other positive electrode active materials in addition to the lithium manganese oxide as the positive electrode active material. For example, the positive electrode 5 may contain any one type or more of other oxides such as a molybdenum oxide, a lithium iron phosphate compound, a lithium cobalt oxide, a lithium nickel oxide, and a vanadium oxide as the positive electrode active material.

In the negative electrode 7, while a type of negative electrode active material is not particularly limited, for example, a negative electrode active material that contains a silicon oxide is preferred. In addition, in the negative electrode 7, the negative electrode active material preferably consists of a silicon oxide represented by $SiOx$ ($0 \leq x < 2$).

In addition, the negative electrode 7 may contain other negative electrode active materials in addition to $SiOx$ ($0 \leq x < 2$) as the negative electrode active material. For example, the negative electrode 7 may contain other negative electrode active materials such as Si and C as the negative electrode active material. In a case of using granular $SiOx$ ($0 \leq x < 2$) as the negative electrode active material, a grain diameter (D50) of $SiOx$ is not particularly limited. For example, the grain diameter (D50) of the negative electrode active material can be selected from a range of 0.1 to 30 μm and preferably can be selected from a range of 1 to 10 μm. In a case where the grain diameter (D50) of $SiOx$ is less than a lower limit value of the range, for example, reactivity in a case of storing or using the battery 1 under a harsh high-temperature high-humidity environment or reactivity caused by reflow processing is increased, and battery characteristics may deteriorate. In addition, in a case where the grain diameter (D50) of $SiOx$ exceeds an upper limit value of the range, a discharge rate may be decreased.

A contained amount of the negative electrode active material, that is, $SiOx$ ($0 \leq x < 2$), in the negative electrode 7 is decided by considering the discharge capacity or the like required for the battery 1. The contained amount of the negative electrode active material in the negative electrode 7 can be selected from a range of 50% by mass or greater and preferably can be selected from a range of 60% by mass to 80% by mass. In the negative electrode 7, in a case where the contained amount of the negative electrode active material consisting of the elements is a lower limit value or greater of the range, a sufficient discharge capacity is easily obtained. In addition, in a case where the contained amount of the negative electrode active material consisting of the elements is an upper limit value or less, the negative electrode 7 is easily molded.

The negative electrode 7 may contain a conductive agent. Hereinafter, the conductive agent used in the negative electrode 7 will be referred to as a "negative electrode conductive agent". The negative electrode conductive agent is the same as the positive electrode conductive agent.

The negative electrode 7 may contain a binder. Hereinafter, the binder used in the negative electrode 7 will be referred to as a "negative electrode binder". As the negative electrode binder, polyvinylidene fluoride (PVDF), styrene-butadiene rubber (SBR), polyacrylate (PA), carboxymethyl cellulose (CMC), polyimide (PI), polyamide-imide (PAI), and the like can be selected.

In addition, as the negative electrode binder, one type of the materials may be used alone, or two types or more may be used in combination. In a case of using polyacrylate in the negative electrode binder, polyacrylate can be adjusted in advance to pH 3 to 10. In this case, for example, alkali metal hydroxide such as lithium hydroxide, or alkaline earth metal hydroxide such as magnesium hydroxide can be used for pH adjustment. For example, a contained amount of the negative electrode binder in the negative electrode 7 is within a range of 1% by mass to 20% by mass.

The separator 9 is interposed between the positive electrode 5 and the negative electrode 7. In the battery 1 of the present embodiment, a lithium body 17 such as a lithium foil is disposed between the negative electrode 7 and the separator 9. An insulating film that has a high ion transmission degree and has mechanical strength is used as the separator 9. For example, non-woven fabric made of glass such as alkali glass, borosilicate glass, quartz glass, and lead glass, or a resin such as polyphenylene sulfide (PPS), polyether ether ketone (PEEK), polyethylene terephthalate (PET), polyamide-imide (PAI), polyamide, and polyimide (PI) can be used as the separator 9. Above all, as the separator 9, non-woven fabric made of glass is preferably used, and non-woven fabric made of borosilicate glass is more preferably used. The non-woven fabric made of glass has exceptional mechanical strength and a high ion transmission degree. Thus, the discharge capacity can be improved by reducing internal resistance. A thickness of the separator 9 is decided by considering a size of the battery 1, a material of the separator 9, and the like. For example, the thickness of the separator 9 can be 5 to 300 μm.

The electrolytic solution 11 is normally obtained by dissolving a supporting electrolyte in a non-aqueous solvent. The non-aqueous solvent of the electrolytic solution 11 of the present embodiment contains tetraglyme (TEG) as a main solvent, diethoxyethane (DEE) as a sub-solvent, and furthermore, ethylene carbonate (EC) and vinylene carbonate (VC) as additives. The non-aqueous solvent is normally decided by considering heat resistance, viscosity, and the like required for the electrolytic solution 11. As the main solvent for constituting a glyme-based solvent, triglyme, pentaglyme, diglyme, and the like can be used in addition to tetraglyme.

A non-aqueous solvent containing ethylene carbonate (EC), tetraglyme (TEG), and diethoxyethane (DEE) is used as the electrolytic solution 11 of the present embodiment. By employing such a configuration, DEE and TEG solvate Li ions forming the supporting electrolyte. At this point, DEE has a higher donor number than TEG. Thus, DEE selectively solvates the Li ions. In such a manner, DEE and TEG solvate the Li ions forming the supporting electrolyte and protect the Li ions. Accordingly, even in a case where moisture enters inside the non-aqueous electrolyte secondary battery under a high-temperature high-humidity environment, reaction between the moisture and Li can be prevented. Thus, an effect of suppressing a decrease in discharge capacity and improving conservation characteristics is obtained.

A ratio of each solvent in the non-aqueous solvent in the electrolytic solution 11 is not particularly limited and can be selected from, for example, a range (total 100%) of TEG: 30% by mass or greater and 48.5% by mass or less, DEE: 30% by mass or greater and 48.5% by mass or less, EC: 0.5% by mass or greater and 10% by mass or less, and VC: 2% by mass or greater and 13% by mass or less. In a case where a ratio of TEG, DEE, and EC included in the non-aqueous solvent is within the range, an action in which DEE protects the Li ions by solvating the Li ions as described above is obtained.

Even with the range, a contained amount of VC is desirably within a range of 2.5% by mass or greater and 10% by mass or less and more preferably within a range of 5.0% by mass or greater and 7.5% by mass or less. Upper limit values of contained amounts of TEG and DEE are preferably 48.25% by mass or less and more preferably 48% by mass or less. In a case where the contained amount of VC is within a range of 2% by mass or greater and 13% by mass or less, a small change in thickness that occurs in the exterior body 3 consisting of the positive electrode can 20 and the negative electrode can 60 is small even upon reception of heat at a time of reflow soldering, and an increase in internal resistance can also be decreased. In addition, in a case where the contained amount of VC is within a range of 2.5% by mass or greater and 10.0% by mass or less, a change in thickness that occurs in an accommodation container 2 can be further decreased even upon reception of heat at a time of reflow soldering, and an increase in internal resistance can also be further decreased. Even with these ranges, the contained amount of VC is most preferably within a range of 5.0% by mass or greater and 7.5% by mass or less.

For example, lithium electrolytes such as organic acid lithium electrolytes including $LiCH_3SO_3$, $LiCF_3SO_3$, $LiN(CF_3SO_2)_2$, $LiN(C_2F_5SO_2)_2$, $LiC(CF_3SO_2)_3$, $LiN(CF_3SO_3)_2$, $LiN(FSO_2)_2$, and the like and inorganic acid lithium electrolytes including $LiPF_6$, $LiBF_4$, $LiB(C_6H_5)_4$, LiCl, LiBr, and the like are exemplary examples of the supporting electrolyte. Above all, as the supporting electrolyte, a lithium electrolyte that is a compound having lithium ion conductivity is preferably used, and $LiN(CF_3SO_2)_2$, $LiN(FSO_2)_2$, and $LiBF_4$ are more preferably used. Particularly, $LiN(CF_3SO_2)_2$ is preferred as the supporting electrolyte from a viewpoint of heat resistance and from a viewpoint that the conservation characteristics can be sufficiently exhibited due to its low reactivity to moisture. As the supporting electrolyte, one type of the materials may be used alone, or two types or more may be used in combination.

A contained amount of the supporting electrolyte in the electrolytic solution 11 can be decided by considering the type and the like of the supporting electrolyte. For example, the contained amount of the supporting electrolyte in the electrolytic solution 11 is preferably 0.1 to 3.5 mol/L, more preferably 0.5 to 3 mol/L, and particularly preferably 1 to 2.5 mol/L. In a case where a concentration of the supporting electrolyte in the electrolytic solution 11 is excessively high or excessively low, a decrease in electric conductivity occurs, and an adverse effect may be exerted on battery characteristics.

The exterior body 3 will be described in detail.

The exterior body 3 includes the positive electrode can 20 that has a bottomed cylindrical shape, the gasket 30 that has a ring shape and is fitted into an inner side of the positive electrode can 20, and the negative electrode can 60 that has a topped cylindrical shape and is attached to the positive electrode can 20 through the gasket 30 by inserting the negative electrode can 60 into an opening portion of the positive electrode can 20. The exterior body 3 forms an accommodation space in which the positive electrode 5 and the negative electrode 7 are accommodated between the positive electrode can 20 and the negative electrode can 60. The positive electrode can 20 and the negative electrode can 60 are arranged at an interval with the gasket 30 interposed therebetween. The exterior body 3 is sealed with the gasket 30 pressed to an outer circumferential surface of the negative electrode can 60 by narrowing an opening edge 21 of the positive electrode can 20 by clamping. The positive electrode can 20, the negative electrode can 60, and the gasket 30 are arranged such that a center axis of each thereof is positioned on a common axis. Hereinafter, this common axis will be referred to as an axis O. In addition, a direction along the axis O will be referred to as an axial direction. The direction that radially extends from the axis O orthogonally to the axis O will be referred to as a radial direction. The direction about the axis O will be referred to as a circumferential direction. In addition, an opening direction of the positive electrode can 20 in the axial direction will be defined as an "upper side" (first direction), and a direction opposite to the upward direction will be defined as a "lower side" (second direction). In addition, a cross section along the axis O will be referred to as a "vertical cross section".

Figure 2:
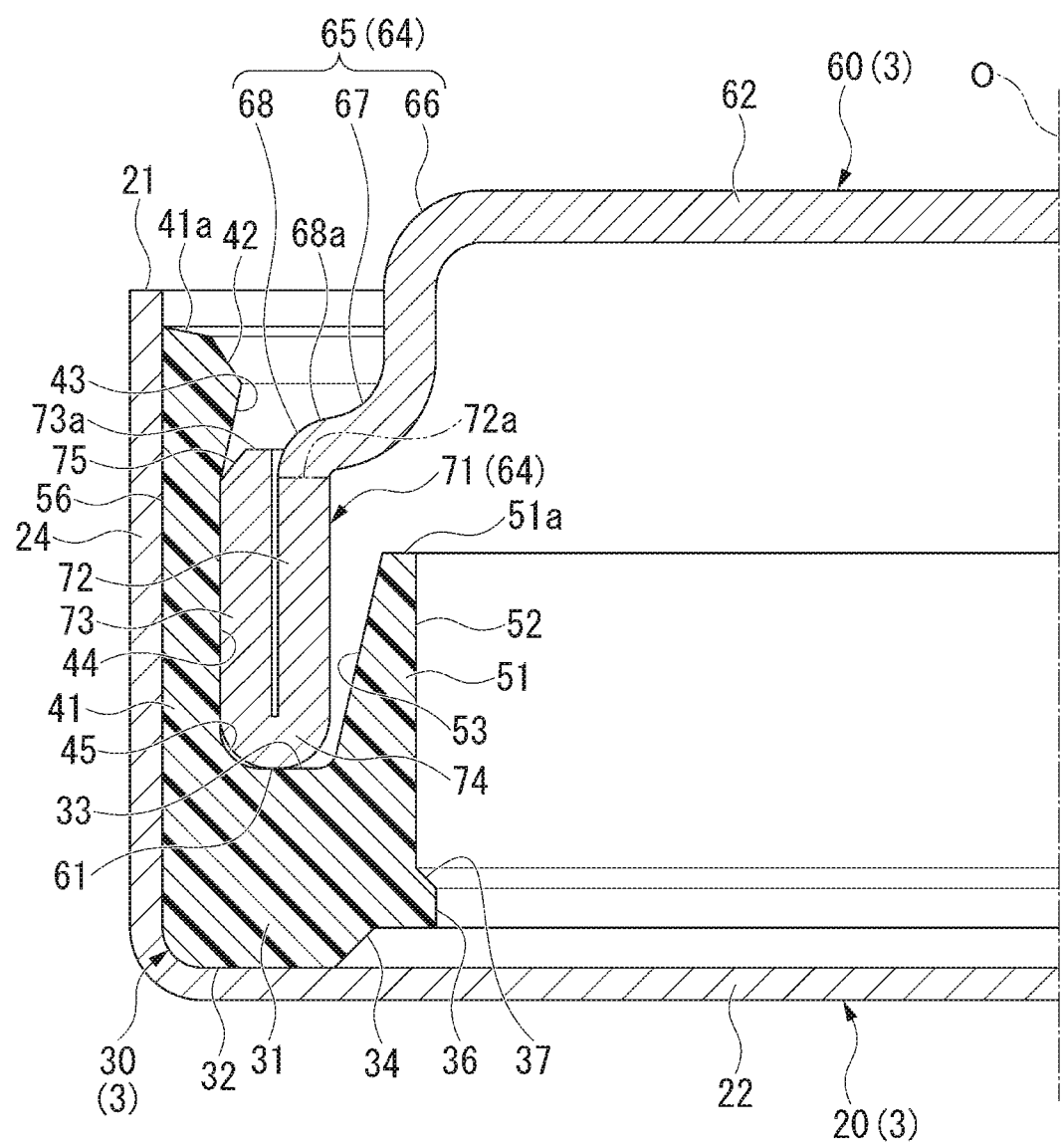
FIG. 2 is a vertical cross-sectional view showing the battery of the embodiment and is a diagram showing a state before an exterior body is sealed.

FIG. 2 is a vertical cross-sectional view showing the battery of the embodiment and is a diagram showing a state before the exterior body is sealed. In FIG. 2, contents such as the positive electrode 5 and the negative electrode 7 are not shown.

As shown in FIG. 2, the positive electrode can 20 is formed into a circular cylindrical shape that is open to the upper side. The positive electrode can 20 includes a bottom portion 22 that has a circular plate shape, and a positive electrode can circumferential wall portion 24 that extends to the upper side from an outer circumferential edge of the bottom portion 22 toward the opening edge 21 of the positive electrode can 20 across the entire circumference. The positive electrode can 20 is formed by performing raising or the like on a stainless steel plate. For example, SUS316L and SUS329J4L can be used as a material of the positive electrode can 20.

Figure 3:
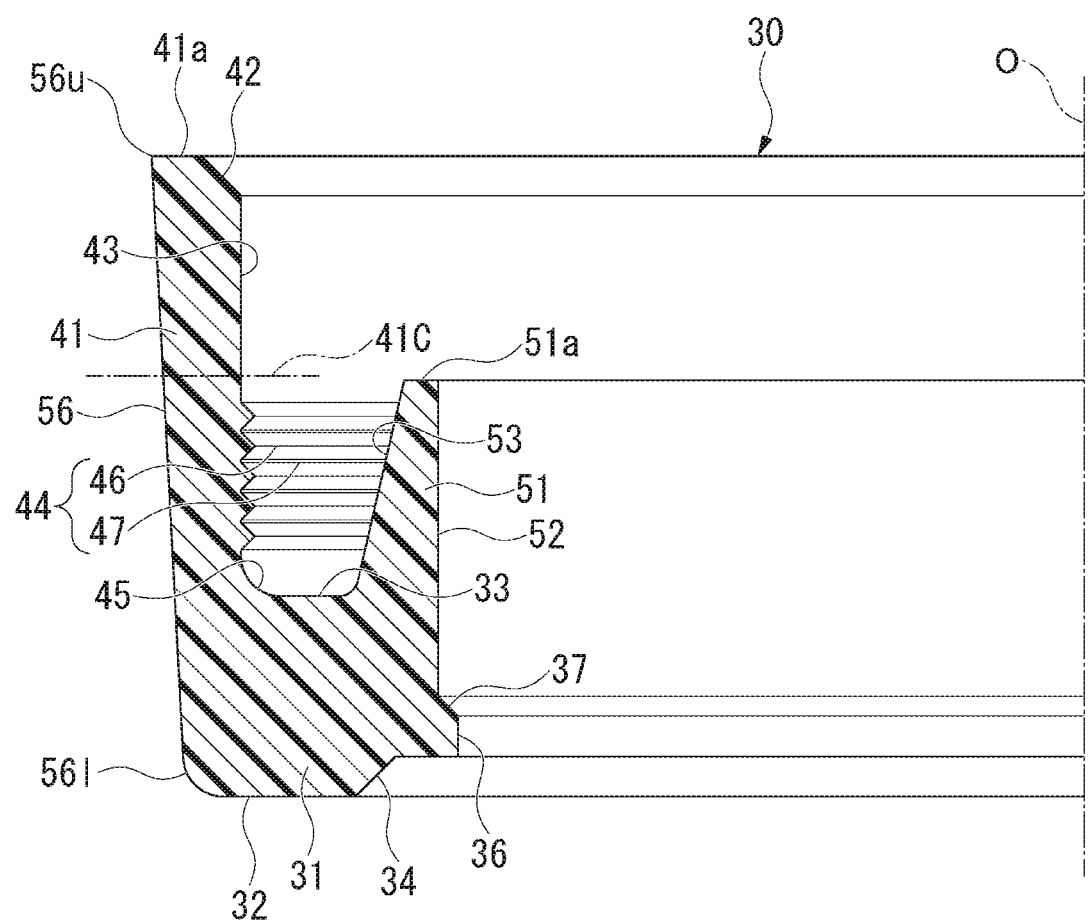
FIG. 3 is a vertical cross-sectional view showing a gasket of the embodiment.

FIG. 3 is a vertical cross-sectional view showing the gasket of the embodiment. In FIG. 3, a singleton state before the gasket 30 is attached to the positive electrode can 20 and the negative electrode can 60 is shown.

As shown in FIG. 3, the gasket 30 includes a base portion 31 that extends across the entire circumference in the circumferential direction, a gate portion 36 that protrudes to an inner side of the radial direction from an inner circumferential surface of the base portion 31, an outer wall portion 41 that extends to the upper side from an outer circumferential portion of the base portion 31 across the entire circumference, and an inner wall portion 51 that extends to the upper side from an inner circumferential portion of the base portion 31 across the entire circumference on an inner side of the outer wall portion 41.

The base portion 31 includes a bottom surface 32 that faces to the lower side, a ceiling surface 33 that faces to the upper side between the outer wall portion 41 and the inner wall portion 51, and an inner circumferential surface 34 that extends to the upper side from an inner circumferential edge of the bottom surface 32. An outer circumferential portion of the bottom surface 32 is formed into a curved surface shape that bulges the lower side and to an outer side of the radial direction, following an inner surface shape of a boundary portion between the bottom portion 22 and the positive electrode can circumferential wall portion 24 in the positive electrode can 20. A lower portion of the inner circumferential surface 34 extends to the upper side and to the inner side of the radial direction from an inner circumferential edge of the bottom surface 32. An upper portion of the inner circumferential surface 34 extends to the upper side in the axial direction from an upper end edge of the lower portion of the inner circumferential surface 34.

The gate portion 36 is disposed across the entire circumference in the circumferential direction. The gate portion 36 is formed on a boundary between the upper portion and the lower portion of the inner circumferential surface 34. Instead, the gate portion 36 may be formed in one of the upper portion and the lower portion of the inner circumferential surface 34. An outer surface of the gate portion 36 has an upper surface 37 that faces in a direction inclined to the upper side from the radial direction. The upper surface 37 is inclined with respect to the radial direction on the vertical cross section and is connected to the upper portion of the inner circumferential surface 34 by extending to the upper side in a direction from the inner side to an outer side of the radial direction. Instead, the upper surface 37 may be connected to an inner circumferential surface of the inner wall portion 51.

The outer wall portion 41 is formed into a circular cylindrical shape. An inner circumferential surface of the outer wall portion 41 includes a chamfered portion 42, a guide portion 43, a sealant holding portion 44, and a curved portion 45. The chamfered portion 42, the guide portion 43, the sealant holding portion 44, and the curved portion 45 are disposed across the entire circumference in the circumferential direction. The chamfered portion 42 is formed at an upper end opening edge of the outer wall portion 41. The chamfered portion 42 faces to the upper side and to the inner side of the radial direction. The guide portion 43 is adjacent to the chamfered portion 42 on the lower side. The guide portion 43 extends to the lower side from the chamfered portion 42. The guide portion 43 extends in the axial direction with a constant inner diameter.

The sealant holding portion 44 is adjacent to the guide portion 43 on the lower side. In the sealant holding portion 44, an uneven structure that can hold a sealant having fluidity is formed. For example, asphalt, epoxy resin, polyamide-based resin, and a butyl rubber-based adhesive can be used as the sealant. The sealant is applied to the sealant holding portion 44 and then, is dried and used. The sealant holding portion 44 includes a plurality of (in the shown example, five) protruding portions 46 that protrude to the inner side of the radial direction and are disposed in the axial direction on the vertical cross section, and groove portions 47 that are formed between the protruding portions 46 adjacent in an up-down direction. The protruding portions 46 and the groove portions 47 are formed into a ring shape and extend across the entire circumference in the circumferential direction. The protruding portions 46 are tapered toward the inner side of the radial direction. Tip ends of the protruding portions 46 are positioned further on the inner side of the radial direction than the guide portion 43. Bottoms of the groove portions 47 are positioned at the same position as the guide portion 43 in the radial direction.

The curved portion 45 is adjacent to the sealant holding portion 44 on the lower side. The curved portion 45 is recessed to the lower side and to the outer side of the radial direction. The curved portion 45 extends in a circular arc shape on the vertical cross section. A lower end portion of the curved portion 45 is smoothly connected to the ceiling surface 33 of the base portion 31.

The inner wall portion 51 is formed into a circular cylindrical shape. An upper end edge 51a of the inner wall portion 51 is positioned further on the lower side than a height center 41C of the outer wall portion 41. The height center 41C of the outer wall portion 41 is a center position between an upper end edge (ceiling surface 33) of the base portion 31 and an upper end edge 41a of the outer wall portion 41 in the axial direction. The upper end edge 51a of the inner wall portion 51 is positioned at approximately the same position as an upper end edge of the sealant holding portion 44 in the axial direction. In the shown example, the upper end edge 51a of the inner wall portion 51 is positioned slightly further on the upper side than the upper end edge of the sealant holding portion 44. An inner circumferential surface 52 of the inner wall portion 51 extends in the axial direction with a constant inner diameter. The inner circumferential surface 52 of the inner wall portion 51 has the same inner diameter as the upper portion of the inner circumferential surface 34 of the base portion 31 and is connected to the inner circumferential surface 34 of the base portion 31. An outer circumferential surface 53 of the inner wall portion 51 extends at an inclination with respect to the axial direction. The outer circumferential surface 53 of the inner wall portion 51 is smoothly connected to the ceiling surface 33 of the base portion 31. A lower end portion of the outer circumferential surface 53 extends in a circular arc shape on the vertical cross section. The lower end portion of the outer circumferential surface 53 is recessed with a smaller radius of curvature than the curved portion 45 of the inner circumferential surface of the outer wall portion 41. The outer circumferential surface 53 extends to the inner side of the radial direction in a direction from the lower side to the upper side. Accordingly, the inner wall portion 51 is gradually thinned in a direction from a lower end portion thereof to the upper side. The outer circumferential surface 53 extends in a straight linear shape on the vertical cross section except for the lower end portion thereof.

An outer circumferential surface of the gasket 30 is disposed from the base portion 31 to the outer wall portion 41. The outer circumferential surface of the gasket 30 includes a tapered portion 56. The tapered portion 56 overlaps with the guide portion 43 and the sealant holding portion 44 in a view from the radial direction. An upper end portion 56u of the tapered portion 56 is disposed further on the upper side than the guide portion 43 in a view from the radial direction. A lower end portion 56l of the tapered portion 56 is disposed further on the lower side than the sealant holding portion 44 in a view from the radial direction. In the present embodiment, the tapered portion 56 is formed on the entire outer circumferential surface of the gasket 30. The tapered portion 56 extends to the outer side of the radial direction with a diameter that is gradually increased in a direction from the lower side to the upper side. In other words, the tapered portion 56 extends to the outer side of the radial direction in a direction from the lower end portion 56l to the upper side. Accordingly, the tapered portion 56 faces in a direction that is inclined to the lower side from the outer side of the radial direction. The tapered portion 56 extends in a straight linear shape on the vertical cross section.

A thickness of the base portion 31 of the gasket 30 in the axial direction is greater than a maximum thickness of the outer wall portion 41 in the radial direction and a maximum thickness of the inner wall portion 51 in the radial direction. The thickness of the base portion 31 of the gasket 30 in the axial direction is an interval between the ceiling surface 33 and the bottom surface 32 of the base portion 31.

For example, the gasket 30 is preferably formed using a resin of which a heat deformation temperature is 230° C. or greater. In a case where the heat deformation temperature of the resin material used in the gasket 30 is 230° C. or greater, significant deformation of the gasket 30 due to heating during reflow soldering processing or use of the battery 1 and leakage of the electrolytic solution 11 can be prevented. For example, polyphenylene sulfide (PPS), polyethylene terephthalate (PET), polyamide, liquid crystal polymer (LCP), tetrafluoroethylene-perfluoroalkyl vinyl ether copolymer resin (PFA), polyether ether ketone resin (PEEK), polyether nitrile resin (PEN), polyether ketone resin (PEK), polyarylate resin, polybutylene terephthalate resin (PBT), polycyclohexanedimethylene terephthalate resin, polyethersulfone resin (PES), polyaminobismaleimide resin, polyetherimide resin, and fluoropolymer resin are exemplary examples of the material of the gasket 30. In addition, these materials can be suitably used by adding glass fiber, a mica whisker, ceramic powder, and the like thereto in an added amount of 30% by mass or less.

Figure 4:
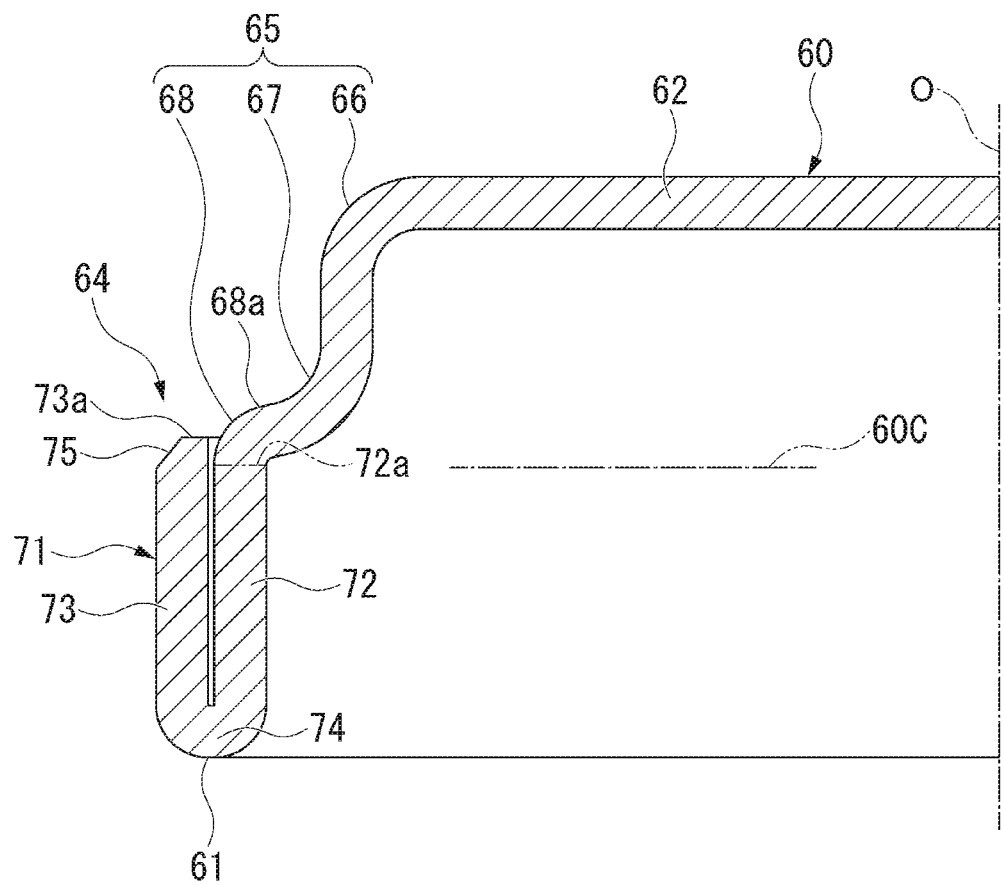
FIG. 4 is a vertical cross-sectional view showing a negative electrode can of the embodiment.

FIG. 4 is a vertical cross-sectional view showing the negative electrode can of the embodiment.

As shown in FIG. 4, the negative electrode can 60 is formed into a circular cylindrical shape that is open to the lower side. The negative electrode can 60 includes a top portion 62 that has a circular plate shape, and a negative electrode can circumferential wall portion 64 that extends to the lower side from an outer circumferential edge of the top portion 62 toward an opening edge 61 of the negative electrode can 60 across the entire circumference. The negative electrode can 60 is formed by performing raising or the like on a stainless steel plate. For example, SUS316L, SUS329J4L, and SUS304 can be used as a material of the negative electrode can 60. In addition, for example, a clad material that is obtained by pressure-bonding copper or nickel to stainless steel may be used as the material of the negative electrode can 60.

An outer circumferential surface of the negative electrode can circumferential wall portion 64 extends such that a diameter thereof is increased from the outer circumferential edge of the top portion 62 toward the opening edge 61 of the negative electrode can 60. The negative electrode can circumferential wall portion 64 includes a double cylinder portion 71 that extends to the upper side from the opening edge 61 of the negative electrode can 60 toward the top portion 62, and a step portion 65 that connects the top portion 62 to the double cylinder portion 71.

The step portion 65 uniformly extends across the entire circumference in the circumferential direction. The step portion 65 includes a first curved portion 66, a second curved portion 67, and a third curved portion 68. The first curved portion 66 is connected to the outer circumferential edge of the top portion 62. The first curved portion 66 extends to the lower side in a curved manner from the outer circumferential edge of the top portion 62. The first curved portion 66 is curved at 90°. On the outer circumferential surface of the negative electrode can circumferential wall portion 64, the first curved portion 66 is curved with a constant first radius of curvature on the vertical cross section. The second curved portion 67 extends in a curved manner to the outer side of the radial direction from a lower end edge of the first curved portion 66. The second curved portion 67 is curved at 90°. On the outer circumferential surface of the negative electrode can circumferential wall portion 64, the second curved portion 67 is curved with a constant second radius of curvature on the vertical cross section. The second radius of curvature is smaller than the first radius of curvature. The third curved portion 68 extends to the lower side in a curved manner from an outer circumferential edge of the second curved portion 67. The third curved portion 68 is curved at 90°. On the outer circumferential surface of the negative electrode can circumferential wall portion 64, the third curved portion 68 is curved with a constant third radius of curvature on the vertical cross section. The third radius of curvature is smaller than the first radius of curvature. In the shown example, the third radius of curvature is equal to the second radius of curvature. The second curved portion 67 and the third curved portion 68 may be curved at an obtuse angle less than 90° as long as a lower end portion of the third curved portion 68 is connected to an upper end edge 72a of an inner cylinder portion 72 described later. In addition, in the shown example, while a portion that extends in a straight linear shape in the axial direction on the vertical cross section is disposed between the first curved portion 66 and the second curved portion 67, presence or absence of the portion extending in a straight linear shape is not particularly limited.

The double cylinder portion 71 has a single unit structure that is folded at the opening edge 61 of the negative electrode can 60. The double cylinder portion 71 includes the inner cylinder portion 72 that extends to the lower side from a lower end edge of the step portion 65 across the entire circumference, an outer cylinder portion 73 that surrounds the inner cylinder portion 72 from the outer side of the radial direction, and a folded portion 74 that is disposed at the opening edge 61 of the negative electrode can 60 to connect the inner cylinder portion 72 to the outer cylinder portion 73.

The inner cylinder portion 72 is connected to the third curved portion 68 and extends in the axial direction with a constant inner diameter and a constant outer diameter. The upper end edge 72a of the inner cylinder portion 72 matches a center of curvature of the third curved portion 68 in the axial direction on the vertical cross section.

The folded portion 74 connects a lower end edge of the inner cylinder portion 72 to a lower end edge of the outer cylinder portion 73. The folded portion 74 extends in a curved manner at 180° from the lower end edge of the inner cylinder portion 72 to the outer side of the radial direction. A lower surface of the folded portion 74 extends in a convex surface shape that protrudes to the lower side on the vertical cross section.

The outer cylinder portion 73 extends to the upper side from the folded portion 74 across the entire circumference. The outer cylinder portion 73 extends in the axial direction with a constant inner diameter and a constant outer diameter along an outer circumferential surface of the inner cylinder portion 72. An inner circumferential surface of the outer cylinder portion 73 may be in contact with the outer circumferential surface of the inner cylinder portion 72 or may be slightly at an interval from the outer circumferential surface of the inner cylinder portion 72. The outer diameter of the outer cylinder portion 73 is equal to the inner diameter of the guide portion 43 of the gasket 30. An upper end edge 73a of the outer cylinder portion 73 is formed into a plane shape that is orthogonal to the axial direction. The upper end edge 73a of the outer cylinder portion 73 is positioned further on a top portion 62 side (upper side) than a center 60C between both ends of the negative electrode can 60 in the axial direction. The upper end edge 73a of the outer cylinder portion 73 is positioned further on the upper side than the upper end edge 72a of the inner cylinder portion 72. In other words, the outer cylinder portion 73 protrudes further to the upper side than the inner cylinder portion 72. The upper end edge 73a of the outer cylinder portion 73 is positioned further on the lower side than an upper end edge 68a of the third curved portion 68. The upper end edge 68a of the third curved portion 68 is a part that matches a boundary between the second curved portion 67 and the third curved portion 68 on the outer circumferential surface of the negative electrode can circumferential wall portion 64 and in which an intersection angle between a tangential direction of the outer circumferential surface of the negative electrode can circumferential wall portion 64 and the axial direction on the vertical cross section has a maximum value.

A chamfered portion 75 is formed in an upper end portion of the outer circumferential surface of the outer cylinder portion 73. The chamfered portion 75 is formed across the entire circumference in the circumferential direction. In the shown example, the chamfered portion 75 has a so-called angled chamfered shape. However, a normal direction of the chamfered portion 75 is not limited to a direction that is inclined at 45° with respect to the radial direction. In addition, the chamfered portion 75 may have a round chamfered shape.

As shown in FIG. 2, the negative electrode can 60 is mounted on the gasket 30 in a state where the sealant (not shown) is applied to the sealant holding portion 44 of the gasket 30. The double cylinder portion 71 of the negative electrode can 60 is inserted into a ring-shaped groove between the outer wall portion 41 and the inner wall portion 51 of the gasket 30. A lower end edge of the double cylinder portion 71 (the opening edge 61 of the negative electrode can 60) abuts the ceiling surface 33 of the base portion 31 of the gasket 30. The inner circumferential surface of the outer wall portion 41 of the gasket 30 is in close contact with the outer circumferential surface of the outer cylinder portion 73 of the double cylinder portion 71 across the entire circumference. The outer circumferential surface of the outer cylinder portion 73 is in contact with at least the entire sealant holding portion 44 on the inner circumferential surface of the outer wall portion 41 of the gasket 30. In the shown example, the double cylinder portion 71 is inserted into an inner side of the outer wall portion 41 such that the protruding portions 46 (refer to FIG. 3) of the sealant holding portion 44 of the gasket 30 are broken by the outer cylinder portion 73. The chamfered portion 75 and the upper end edge 73a of the outer cylinder portion 73 are positioned further on the upper side than the sealant holding portion 44 and further on the lower side than the upper end edge 41a of the outer wall portion 41. The negative electrode can 60 is inserted into an inner side of the positive electrode can 20 together with the gasket 30 in a state where the negative electrode can 60 is mounted on the gasket 30. The negative electrode can 60 is arranged such that the top portion 62 protrudes to the upper side from the positive electrode can 20.

The gasket 30 is inserted into the opening portion of the positive electrode can 20 from the upper side. The bottom surface 32 of the base portion 31 of the gasket 30 is in contact with an upper surface of the bottom portion 22 of the positive electrode can 20. The outer circumferential surface of the gasket 30 is in close contact with an inner circumferential surface of the positive electrode can circumferential wall portion 24 across the entire circumference. The outer circumferential surface of the gasket 30 is in contact with the inner circumferential surface of the positive electrode can circumferential wall portion 24 across the entire length in the axial direction. Here, the gasket 30 is formed such that the tapered portion 56 of the outer circumferential surface faces further to the lower side than the outer side of the radial direction in the singleton state. Thus, the gasket 30 is pressed to the inner side of the radial direction by the positive electrode can circumferential wall portion 24 by inserting the gasket 30 into the positive electrode can 20. Accordingly, the outer wall portion 41 of the gasket 30 is deformed such that part thereof at an interval from the negative electrode can 60 in the radial direction is displaced to the inner side of the radial direction. In the shown example, part of the outer wall portion 41 of the gasket 30 that is positioned further on the upper side than the outer cylinder portion 73 of the negative electrode can 60 is displaced to the inner side of the radial direction. Consequently, an upper portion of the guide portion 43 on the inner circumferential surface of the outer wall portion 41 of the gasket 30 expands further to the inner side of the radial direction than the outer circumferential surface of the outer cylinder portion 73 on the upper side of the outer cylinder portion 73 of the negative electrode can 60.

As shown in FIG. 1, the positive electrode can 20 is subjected to clamping such that an upper portion of the positive electrode can circumferential wall portion 24 is narrowed. The opening edge 21 of the positive electrode can 20 is narrowed further to the inner side of the radial direction than the upper end edge 73a of the outer cylinder portion 73 of the negative electrode can 60. By narrowing the upper portion of the positive electrode can circumferential wall portion 24, the gasket 30 is deformed such that part thereof at an interval from the negative electrode can 60 in the radial direction is displaced to the inner side of the radial direction. Consequently, the outer wall portion 41 of the gasket 30 is arranged from an outer side of the outer cylinder portion 73 in the radial direction to the upper side of the third curved portion 68 through the upper side of the outer cylinder portion 73. The outer wall portion 41 is in close contact with the chamfered portion 75 and the upper end edge 73a on the outer cylinder portion 73 of the negative electrode can 60 and the third curved portion 68 of the step portion 65 from the upper side. In addition, the negative electrode can 60 is pressed to the lower side by the upper portion of the positive electrode can circumferential wall portion 24 through the gasket 30. Accordingly, by applying a pressure to the base portion 31 of the gasket 30 by the opening edge 61 of the negative electrode can 60, the outer circumferential surface 53 of the inner wall portion 51 is deformed along the inner circumferential surface of the negative electrode can circumferential wall portion 64.

As described above, in the battery 1 of the present embodiment, the upper end edge 73a of the outer cylinder portion 73 of the negative electrode can 60 is positioned further on the upper side than the center 60C between both ends of the negative electrode can 60 in the axial direction and is positioned further on the lower side than the upper end edge 68a of the third curved portion 68. According to this configuration, the outer cylinder portion 73 that is large in the axial direction can be disposed. Thus, the negative electrode can circumferential wall portion 64 can be provided with high durability against a pressure applied from the outer side of the radial direction. Accordingly, a strong pressure can be applied to the gasket 30 by narrowing the opening edge 21 of the positive electrode can 20, and the negative electrode can 60 can be sufficiently pressed from the upper side and from the outer side of the radial direction. Accordingly, since the outer cylinder portion 73 does not protrude further to the upper side than the third curved portion 68, penetration of the outer cylinder portion 73 into the gasket 30 arranged on the upper side of the outer cylinder portion 73 can be suppressed. Thus, even in a case where a strong pressure is applied to the gasket 30, damage to the gasket 30 by contact with the outer cylinder portion 73 can be suppressed. Accordingly, since moisture that enters inside from the opening portion of the positive electrode can 20 through a surface of the gasket 30 can be suppressed, even the battery 1 of which the thickness is increased in order to increase an electric capacity can be provided with exceptional sealability. Accordingly, the reflow-solderable battery 1 that has exceptional sealability and a high electric capacity can be provided.

In addition, the upper end edge 73a of the outer cylinder portion 73 is positioned further on the upper side than the upper end edge 72a of the inner cylinder portion 72. According to this configuration, the entire inner cylinder portion 72 can be surrounded by the outer cylinder portion 73. Accordingly, since a part having a double structure can be disposed to the maximum extent in the double cylinder portion 71, the double cylinder portion 71 can be provided with higher durability.

In the gasket 30, the thickness of the base portion 31 in the axial direction is greater than the maximum thickness of each of the outer wall portion 41 and the inner wall portion 51 in the radial direction. According to this configuration, the thickness of particularly part of the outer wall portion 41 that is close to the base portion 31 can be secured. Accordingly, in the battery 1 of which the thickness is increased in order to increase the electric capacity, strength of the gasket 30 can be secured. In addition, since a sufficient amount of the gasket 30 is arranged between the bottom portion 22 of the positive electrode can 20 and the opening edge 61 of the negative electrode can 60, the positive electrode can 20 and the negative electrode can 60 can be sufficiently brought into close contact with the gasket 30 in a case of clamping of the positive electrode can 20. Accordingly, the battery 1 having exceptional sealability can be formed.

Furthermore, a length of the negative electrode can circumferential wall portion 64 in the axial direction can be reduced by an amount corresponding to an increase in thickness of the base portion 31 in the axial direction. Thus, a force exerted on the negative electrode can circumferential wall portion 64 can be decreased by reducing an area of the negative electrode can circumferential wall portion 64 in which a pressure is applied through the gasket 30. Thus, deformation of the negative electrode can 60 can be suppressed.

The chamfered portion 75 is formed in the upper end portion of the outer circumferential surface of the outer cylinder portion 73. Accordingly, application of an excessive pressure from the outer cylinder portion 73 to the gasket 30 arranged on the upper side of the outer cylinder portion 73 can be suppressed. Thus, even in a case where a strong pressure is applied to the gasket 30, damage to the gasket 30 by contact with the outer cylinder portion 73 can be suppressed.

The present invention is not limited to the embodiment described with reference to the drawings, and various modification examples are considered within the technical scope thereof.

For example, while the gasket 30 is in contact with the upper surface of the bottom portion 22 of the positive electrode can 20 in the embodiment, for example, the separator and the positive electrode may be arranged between the gasket and the bottom portion of the positive electrode can.

In addition, while each of the first curved portion 66, the second curved portion 67, and the third curved portion 68 is curved with a constant curvature in the embodiment, the curvatures of the first curved portion, the second curved portion, and the third curved portion may be changed.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. An electrochemical cell comprising:
a positive electrode can that is formed into a bottomed cylindrical shape and comprises a bottom portion and a positive electrode can circumferential wall portion extending in a first direction of an axial direction from an outer circumferential edge of the bottom portion;
a negative electrode can that is formed into a topped cylindrical shape, comprises a top portion and a negative electrode can circumferential wall portion extending in a second direction of the axial direction from an outer circumferential edge of the top portion, and is inserted into an inner side of the positive electrode can; and
a gasket that is arranged between the positive electrode can circumferential wall portion and the negative electrode can circumferential wall portion and is pressed to an outer circumferential surface of the negative electrode can by narrowing an opening edge of the positive electrode can,
wherein the negative electrode can circumferential wall portion comprises
a double cylinder portion that extends in the first direction from an opening edge of the negative electrode can toward the top portion, and
a step portion that connects the top portion to the double cylinder portion, the step portion comprises
a first curved portion that extends in a 90° curved manner in the second direction from the outer circumferential edge of the top portion,
a second curved portion that extends in a curved manner from an end edge of the first curved portion in the second direction to an outer side of a radial direction, and
a third curved portion that extends in a curved manner in the second direction from an outer circumferential edge of the second curved portion,
the double cylinder portion comprises
an inner cylinder portion that extends in the second direction from an edge of the third curved portion in the second direction, an outer cylinder portion that extends in the axial direction along an outer circumferential surface of the inner cylinder portion and surrounds the inner cylinder portion from the outer side of the radial direction, and a folded portion that is disposed at the opening edge of the negative electrode can and connects the inner cylinder portion to the outer cylinder portion, the gasket is arranged on at least an outer side of the outer cylinder portion in the radial direction and in the first direction, an end edge of the outer cylinder portion in the first direction is positioned further in the first direction than a center between both ends of the negative electrode can in the axial direction and is positioned further in the second direction than an end edge of the third curved portion in the first direction, and the end edge of the outer cylinder portion in the first direction is positioned further in the first direction than an end edge of the inner cylinder portion in the first direction.

2. The electrochemical cell according to claim 1, wherein the gasket comprises a ring-shaped base portion that is arranged between the bottom portion of the positive electrode can and the opening edge of the negative electrode can, an outer wall portion that protrudes in the first direction from an outer circumferential portion of the base portion that extends across an entire circumference in a circumferential direction, and is arranged between the positive electrode can circumferential wall portion and the negative electrode can circumferential wall portion, and an inner wall portion that protrudes in the first direction from the base portion on an inner side of the negative electrode can circumferential wall portion and extends across the entire circumference in the circumferential direction, and a thickness of the base portion in the axial direction is greater than a maximum thickness of each of the outer wall portion and the inner wall portion in the radial direction.

3. The electrochemical cell according to claim 2, wherein an end portion of the outer circumferential surface of the outer cylinder portion in the first direction is chamfered across the entire circumference.

4. The electrochemical cell according to claim 1, wherein an end portion of the outer circumferential surface of the outer cylinder portion in the first direction is chamfered across the entire circumference.

* * * * *